Dec. 10, 1929.  O. KURZ  1,738,909
INTERMITTENT DRIVE FOR SCOREKEEPING DEVICES
Filed May 5, 1927  2 Sheets-Sheet 1

Inventor
Otto Kurz
By Rudolph [signature]
Attorney.

Dec. 10, 1929.  O. KURZ  1,738,909
INTERMITTENT DRIVE FOR SCOREKEEPING DEVICES
Filed May 5, 1927  2 Sheets-Sheet 2
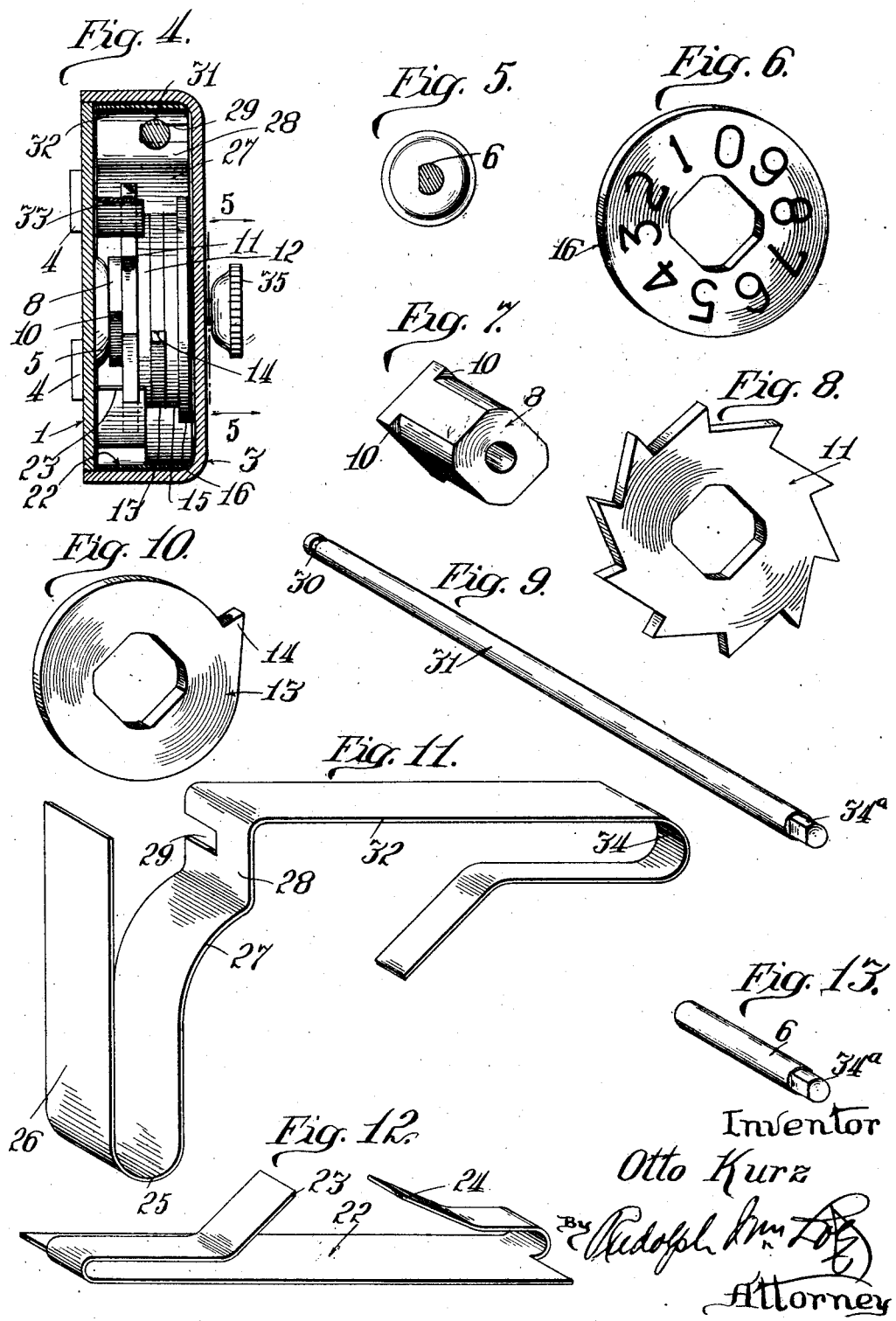

Patented Dec. 10, 1929

1,738,909

UNITED STATES PATENT OFFICE

OTTO KURZ, OF CHICAGO, ILLINOIS; ANNA M. KURZ ADMINISTRATRIX OF SAID OTTO KURZ, DECEASED

INTERMITTENT DRIVE FOR SCOREKEEPING DEVICES

Application filed May 5, 1927. Serial No. 188,935.

This invention has for its object to provide a very small device to be worn like a wristwatch for use in keeping golf or other game scores and comprises what, in its main features, constitutes an old and well-known mechanism, the invention residing in certain novel structural characteristics whereby the cost of manufacture of the device is reduced to a very low point and great durability of the operating parts is assured, these specific improvements being of such a nature as to permit the device to be made of minute dimensions without rendering the same delicate.

The preferred embodiment of the invention is illustrated in the accompanying drawings, wherein:—

Figure 4 is a sectional view on the line 4—4 of Figure 2.

Figure 5 is a detail section on the line 5—5 of Figure 4.

Fig. 6 is a perspective view of a numeral bearing disk included in the structure.

Fig. 7 is a perspective view of one of the hollow shafts included in the structure.

Fig. 8 is a perspective view of one of the ratchet disks or wheels included in the structure.

Fig. 9 is a perspective view of the plunger rod of the structure.

Fig. 10 is a perspective view of the power transmitting disk of the device.

Figs. 11 and 112 are perspective views of the several respective flat springs of the structure.

Fig. 13 is a perspective view of one of the shafts of the structure.

Figure 1:
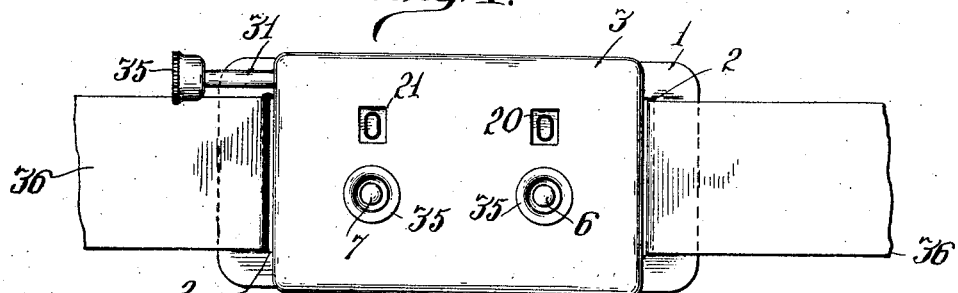
Figure 1 is a front elevation of a scorekeeping device constructed in accordance with the invention.

The device includes a relatively shallow rectangular, closed casing consisting of a flat back-plate 1 having slots 2 adjacent opposite ends, and a sheet-metal box-like element 3, the end walls of which are provided with tongues 4 which are passed through the said slots 2 and bent over upon the middle portion of the plate 1 to thus firmly secure the member 3 to said plate.

Figure 2:
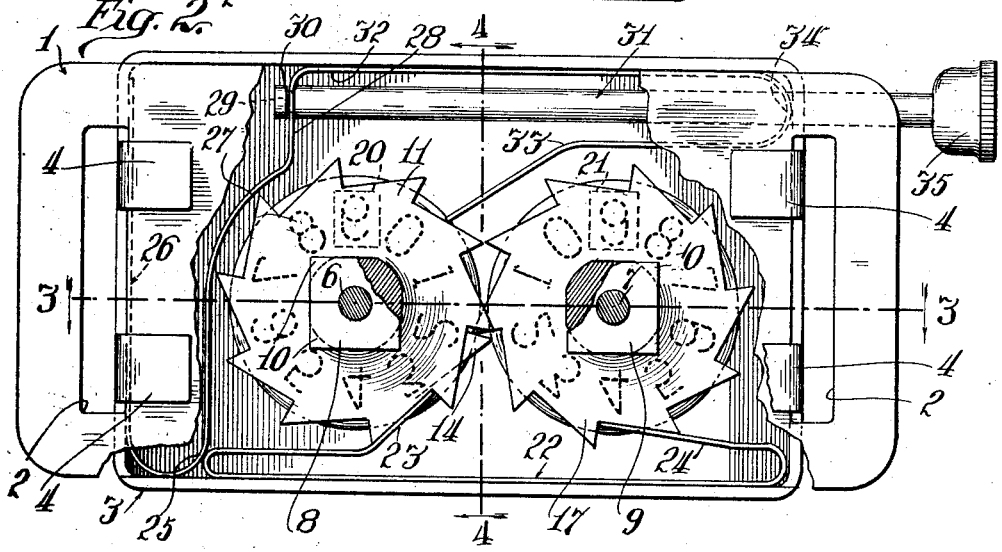
Figure 2 is a rear elevation of the same, partly in section.
Figure 3:
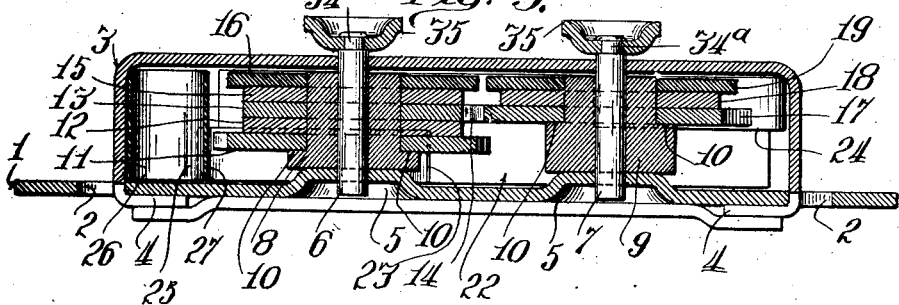
Figure 3 is a section of the same on the line 3—3 of Figure 2.

The plate 1 is provided with dished portions 5 in the centers of which are perforations to receive the ends of the shafts 6 and 7 respectively, the latter passing also through the openings in the member 3 which are axially aligned with said openings in the plate 1. Said shafts 6 and 7 are driven into the axial bores of rectangular blocks 8 and 9, respectively, the corners of which are partly rounded concentrically with the bores thereof, there being substantially triangular stop shoulders 10 at the ends of said rounded portions as shown in Figures 2 and 7. The shafts 6 and 7 are non-rotatable relatively to the respective members 8 and 9 which may be conveniently termed carriers since they carry ratchets, spacing washers and dial-disks hereinafter particularly described.

The uncut square end portions of said carriers 8 and 9 oppose the dished portions 5 of the plate 1. Mounted upon the carrier 8 in the order named are, respectively, a ratchet wheel 11 which abuts the shoulders 10, a spacing washer 12, a disk 13 equipped with a projecting ratchet-tooth 14, a spacing washer 15 and a dial disk 16, the latter provided on the face opposing the outer wall of the member 3 with regularly spaced numerals, zero to nine, inclusively, a total of ten numerals which corresponds to the number of teeth of the ratchet 11.

On the carrier 9 are mounted a ratchet 17 which abuts the shoulders 10 of said carrier 9, a spacing washer 18 and a dial disk 19. The shoulders 10 of the carrier 9 are spaced farther from the square-faced end of the latter than are the shoulders 10 of the carrier 8, the relative spacing of the respective sets of shoulders 10 being such that the ratchet 17 is opposed to the toothed disk 13. The dial disk 19 corresponds in all respects with the dial disk 16 except that the numerals, zero to nine thereof are disposed reversely to the said numerals of said disk 16. In use the disk 16 is rotated clockwise and disk 19 anti-clockwise. In the outer wall of the member 3 are two openings 20 and 21, respectively, through which the numerals on the respective dial disks are successively visible. All of the wheels and disks and washers above described are provided with central openings corresponding in shape and size with the rounded corner portions of the carriers 8 and 9.

Resting upon the bottom wall of the member 3, and confined between its outer wall and the plate 1, is a flat spring 22 having its opposite end portions cut away at one side each and oppositely with respect to each other as shown in Figure 12 to provide two narrow terminal portions 23 and 24, respectively, which are bent to overhang the middle or body portion of said spring and constitute spring tongues having their free ends disposed in engagement with the ratchets 11 and 17, respectively, said tongues 23 and 24 being offset from each other a distance corresponding to the offset of said ratchets from each other. As the latter are rotated in respectively opposite directions, the teeth thereof are necessarily oppositely disposed and the spring tongues 23 and 24 serve to prevent rotation of said ratchets in one direction and to retain said ratchets in respective positions to cause a numeral of each of the dial disks to be disposed opposite an opening 20 and 21, respectively. This spring is held against longitudinal movement by contact at one end with an end wall of the member 3 and at its other end with a loop 25 of the spring 26. The latter is formed also of a flat strip of suitable metal of a general width equal to the depth of the member 3, the loop 25 being at the base of a U-shaped end portion, one arm of which lies in contact with an end wall of the member 3 and is of a length to correspond with the width of said member 3, so that said U-shaped end portion is confined between the side wall of said member 3 and plate 1. The other arm of said U-shaped end portion is, in part parallel with the other arm thereof, has a portion 27 bent outwardly in a curve which connects with another straight portion 28 which is substantially parallel with the other arm. In this portion 28, I provide a recess 29 extending inwardly from one side, the parallel walls of said recess engaging in the annular groove 30 in the inner end portion of the reciprocable plunger 31 which, at its other end, projects through an opening in the end wall of the member 3 opposite to that engaged by an arm of the loop 25. The mouth of said recess 29 is opposed to and closed by the outer wall of the member 3 and thus prevents disengagement of the plunger 31.

The spring 26 includes the horizontally disposed U-shaped portion the upper arm 32 of which is integral with and extends at a right angle to the portion 28 and is of the same width as the latter, the lower arm 33 including the arcuate portion 34 being of about one-half the width of the arm 32 and having one side edge flush with a side edge of the latter to thus provide a recess for the passage of the plunger 31. The free end portion of the arm 33 is bent at a downward incline and normally bears upon a face of one of the teeth of the ratchet 11 at a point substantially vertically aligned with the free end of the arm 23 of the spring 22 and exerting a pressure tending to rotate the said ratchet 11 reversely of its normal direction of rotation to thus hold a tooth thereof firmly engaged with said arm 23 of the spring 22. The arm 33 of the spring 26 constitutes a dog for actuating the ratchet 11 as the plunger 31 is forced inwardly to the limit of its movement to rotate the ratchet through an arc very slightly in excess of one-tenth of a revolution to thereby cause a tooth thereof to pass the end of the arm 23 of the spring 22. Obviously during each complete revolution of the ratchet 11, the tooth 14 of disk 13 will engage a tooth of ratchet 17 to thereby rotate ratchet 17 through an arc slightly exceeding one-tenth of a revolution, the arms 23 and 24 of spring 22 serving to reverse the excess rotation to exactly one-tenth of a revolution as the plunger is released, this action of retaining pawls or dogs being common in the art.

The projecting ends of the shafts 6 and 7 and plunger 31 terminate in annularly reduced portions $34^a$ which are cut away at one side and snugly fit openings in the cup shaped knurl-edged knobs 35 which abut the annular shoulders at the bases of the end portions $34^a$ to non-rotatably engage said shafts and plunger and are firmly secured by upsetting the extreme ends of said portions $34^a$ like rivets.

From the foregoing it will be obvious that the device possesses all of the advantageous characteristics hereinbefore pointed out. The slots 2 in the plate 1 afford means for securing straps 36 to the device for securing the latter to the wrist of the wearer. By means of the knobs on the shafts 6 and 7 the ratchets and dial disks may be digitally set to bring any desired numerals opposite the respective openings 21 and 21.

It will be particularly noted that the ratchets cooperate with the casing walls to hold the respective springs firmly in place.

I claim as my invention:

1. A device of the kind specified including a casing, a pair of operatively associated ratchet wheels housed thereby, a flat spring having opposed end portions engaging the respective ratchets for preventing rotation in one direction of each thereof, said spring mounted in said casing and held in place therein by the walls thereof and by engagement with said ratchet wheels, a second spring housed by and mounted in said casing and including a free end portion engaged with one of said ratchet wheels, and a reciprocable plunger associated with the last-named spring and with the casing for causing said free end portion of said last-named spring to rotate the ratchet wheel associated therewith as said plunger is moved against the action of said spring.

2. A device of the kind specified including a casing, a pair of operatively associated ratchets housed thereby, a manually reciprocable plunger projecting at one end from said casing, and two springs mounted in said casing, and held in place partly by engagement with the walls thereof, one of said springs having its opposite end portions engaged, respectively, with said respective ratchets, the latter coacting with the casing walls to hold said spring in place, the other of said springs including two relatively perpendicularly disposed U-shaped loop portions, one of said portions having a free arm engaged with one of said ratchets, said last-named spring secured to said plunger to cause the latter to contract the mouth portion of one of said U-shaped loop portions when forced inwardly of the casing to thereby cause said free arm to rotate the ratchet associated therewith, the latter coacting with the casing walls to hold said spring in place.

3. Mechanism of the kind specified including a casing, a plurality of operatively associated ratchets therein, a plurality of flat springs mounted in said casing, said springs including parts engaged with the several ratchets for preventing rotation of each thereof in one direction, one of said springs including two relatively perpendicularly disposed U-shaped loops, and a reciprocable plunger engaged with one arm of one of said loops, the other of said loops having one of its arms connected with the last-named arm of the other loop and having a free arm opposed thereto and engaged with one of said ratchets for rotating the same as said plunger is actuated to contract the first-named loop of said spring, said springs being respectively firmly held in place by cooperation of the ratchets with the walls of said casing.

4. Mechanism of the kind specified including a casing, a plurality of operatively associated ratchets therein, a plurality of flat springs mounted in said casing, one of said springs including two relatively perpendicularly disposed U-shaped loops, one arm of one of said loops provided with a recess in one side edge thereof, and a reciprocable plunger detachably engaged with the walls of said recess, the other of said loops having one of its arms connected with the last-named arm of the other loop and having a free arm opposed thereto and engaged with one of said ratchets for rotating the same as said plunger is actuated to contract the first-named loop of said spring, said springs being respectively firmly held in place by cooperation of the ratchets with the walls of said casing.

OTTO KURZ.